United States Patent
Nishino et al.

(10) Patent No.: US 12,326,502 B2
(45) Date of Patent: Jun. 10, 2025

(54) OBJECT DETECTION DEVICE

(71) Applicant: DENSO CORPORATION, Kariya (JP)

(72) Inventors: Sakiko Nishino, Nisshin (JP); Yu Koyama, Nisshin (JP); Takuya Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 10 days.

(21) Appl. No.: 18/357,001

(22) Filed: Jul. 21, 2023

(65) Prior Publication Data
US 2023/0358884 A1 Nov. 9, 2023

Related U.S. Application Data

(63) Continuation of application No. PCT/JP2021/046831, filed on Dec. 17, 2021.

(30) Foreign Application Priority Data

Jan. 22, 2021 (JP) ................... 2021-009007

(51) Int. Cl.
*G01S 15/04* (2006.01)
*G01S 7/524* (2006.01)
(Continued)

(52) U.S. Cl.
CPC .............. *G01S 15/04* (2013.01); *G01S 7/524* (2013.01); *G01S 7/526* (2013.01); *G01S 2015/932* (2013.01)

(58) Field of Classification Search
CPC .......... G01S 15/04; G01S 7/524; G01S 7/526; G01S 2015/932
See application file for complete search history.

(56) References Cited

U.S. PATENT DOCUMENTS

2010/0148977 A1* 6/2010 Tseng .................... G06V 10/10
340/686.1
2011/0128819 A1* 6/2011 Jiang ....................... G01S 7/53
367/99
(Continued)

FOREIGN PATENT DOCUMENTS

JP 61-110075 A 5/1986
JP 11-326481 A 11/1999
(Continued)

OTHER PUBLICATIONS

"Nondestructive Measurement for Maturity of Muskmelons by Analysis of Acoustic Signals" Setsuo Hayashi et al., Nippon Shokuhin Kogyo Gakkaishi [on line], J-STAGE, Feb. 17, 2011 [search on May 20, 2024], vol. 39, No. 6, pp. 465-470.

*Primary Examiner* — Hoi C Lau
(74) *Attorney, Agent, or Firm* — Maschoff Brennan

(57) ABSTRACT

An object detection device for detecting an object by transmitting and receiving ultrasonic waves, includes a transmitter that transmits an ultrasonic wave, two or more receivers, each of which receives an ultrasonic wave and outputs an reception signal according to the received ultrasonic wave, a comparator that compares the plurality of reception signals output from the two or more receivers and calculates a degree of similarity between the plurality of reception signals, and a determiner that makes a determination as to whether there is an object to be detected, based on the degree of similarity.

15 Claims, 11 Drawing Sheets

(51) Int. Cl.
    *G01S 7/526*     (2006.01)
    *G01S 15/931*     (2020.01)

(56)     References Cited

U.S. PATENT DOCUMENTS

| | | | | |
|---|---|---|---|---|
| 2012/0170411 | A1* | 7/2012 | Suzuki | G01S 7/5276 |
| | | | | 367/99 |
| 2015/0206415 | A1* | 7/2015 | Wegelin | G08B 21/245 |
| | | | | 340/573.4 |
| 2015/0307091 | A1* | 10/2015 | Gokan | G01S 7/539 |
| | | | | 701/70 |
| 2020/0018849 | A1* | 1/2020 | Vasile | G01S 15/42 |
| 2021/0302571 | A1* | 9/2021 | Sassa | B60W 30/18009 |
| 2022/0317295 | A1* | 10/2022 | Yamashita | G01S 15/86 |
| 2022/0342062 | A1* | 10/2022 | Hardy | G01S 15/42 |
| 2022/0397665 | A1* | 12/2022 | Matthies | G01S 7/539 |
| 2023/0264628 | A1* | 8/2023 | Kim | G01S 13/865 |
| | | | | 340/468 |
| 2023/0358884 | A1* | 11/2023 | Nishino | G01S 15/04 |
| 2023/0400572 | A1* | 12/2023 | Ishikawa | G01S 7/527 |

FOREIGN PATENT DOCUMENTS

| | | |
|---|---|---|
| JP | H11-344551 A | 12/1999 |
| JP | 2009-156666 A | 7/2009 |
| JP | 2015-055571 A | 3/2015 |
| JP | 2015-166705 A | 9/2015 |

* cited by examiner

ROAD SURFACE

ROAD SURFACE

ROAD SURFACE

OBJECT DETECTION DEVICE

CROSS-REFERENCE TO RELATED APPLICATION

This application is a continuation application of International Application No. PCT/JP2021/046831 filed Dec. 17, 2021 which designated the U.S. and claims priority to Japanese Patent Application No. 2021-9007 filed with the Japan Patent Office on Jan. 22, 2021, the contents of each of which are incorporated herein by reference.

BACKGROUND

Technical Field

This disclosure relates to an object detection device for detecting an object by transmitting and receiving ultrasonic waves.

Related Art

A technique has been proposed to perform automatic parking and other operations using this type of object detection device. To improve the accuracy of obstacle detection in such a technique, it is necessary to determine a height of a detected object from the ground. For example, there is a known technique for determining a type of obstacle based on the number of peaks in a reflected sonar signal.

Specifically, two reflected waves are returned from an obstacle such as a tall wall or the like, and one reflected wave is returned from an obstacle such as a low curb or the like. Therefore, when the number of peaks is two, the obstacle is determined to be a wall, and when the number of peaks is one, the obstacle is determined to be a curb.

DESCRIPTION OF SPECIFIC EMBODIMENTS

Figure 1:
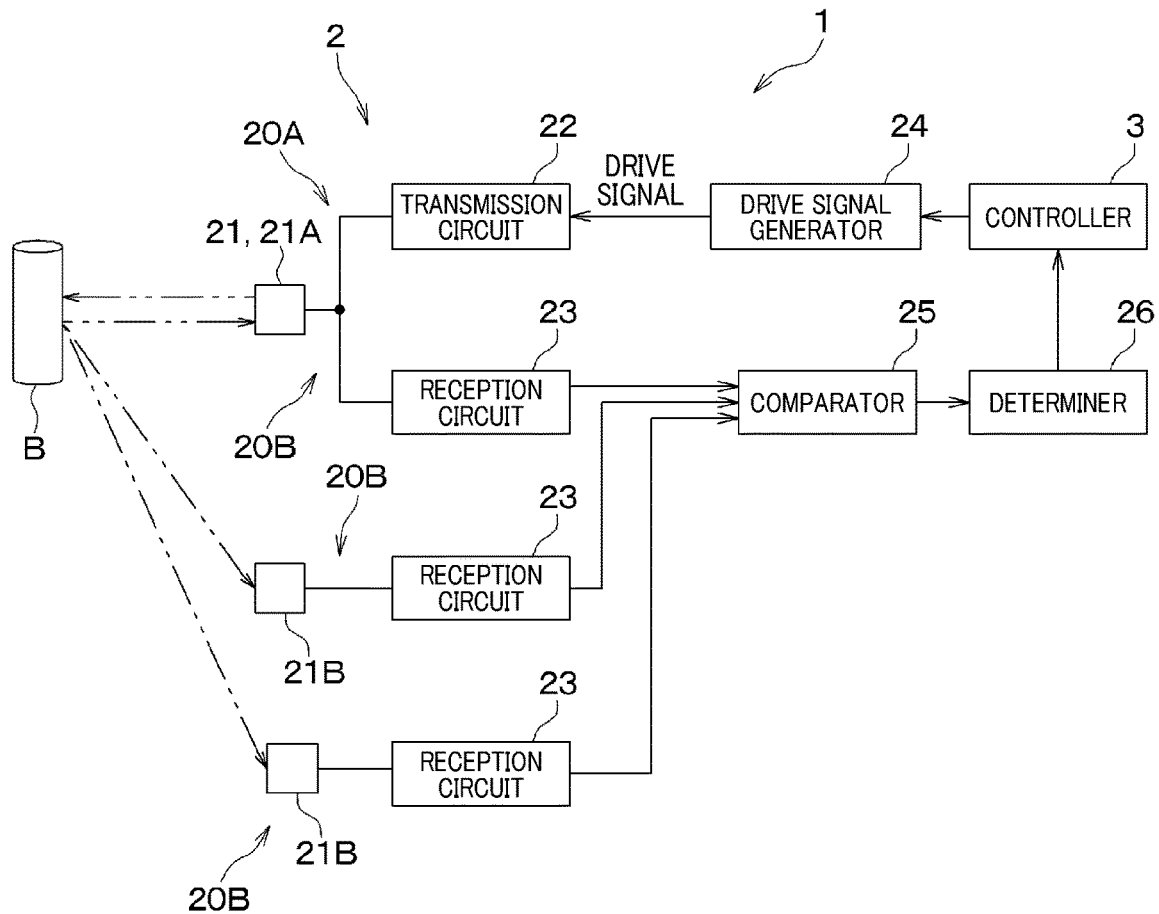
FIG. 1 is a block diagram of an object detection device according to a first embodiment.

In cases where the road surface has large unevenness, such as rough asphalt, grating and the like, a plurality of peaks may be detected from the reflected signal, as is the case with tall objects. Thus, with the known method, as disclosed in JP 5846316 B, of determining the type of obstacle based on the number of peaks, there is a risk that a reflected wave from a road surface that is not the target for detection may be mistakenly determined to be a reflected wave from a tall object.

In view of the foregoing, it is desired to have an object detection device capable of improving the accuracy of object determination.

According to one aspect of the present disclosure, an object detection device for detecting an object by transmitting and receiving ultrasonic waves, including: a transmitter that transmits an ultrasonic wave; two or more receivers, each of which receives an ultrasonic wave and outputs an reception signal according to the received ultrasonic wave; a comparator that compares the plurality of reception signals output from the two or more receivers and calculates a degree of similarity between the plurality of reception signals; and a determiner that makes a determination as to whether there is an object to be detected, based on the degree of similarity.

The inventors analysed reflected waves from various objects and found the following. That is, waveforms of reflected waves from a somewhat tall object, received by a two or more receivers, are similar to each other, although there are differences in intensity and time depending on positions of the respective receivers. In contrast, waveforms of reflected waves from an uneven and complex shaped road surface, received by the two or more receivers, are very different from one receiver to another. This may be because there are a number of reflection paths caused by the complex shape. Therefore, object determination accuracy can be improved by determining whether there is an object to be detected based on the degree of similarity between a plurality of reception signals.

Hereinafter, embodiments of the present disclosure will be described with reference to the accompanying drawings. In the following embodiments, the same or equivalent parts are assigned with the same reference numerals in the drawings, and the same description is adopted for parts with the same reference numerals.

First Embodiment

A first embodiment will now be described. An object detection device 1 of the present embodiment illustrated in FIG. 1 detects objects by transmitting and receiving ultrasonic waves. The object detection device 1 is mounted to a vehicle (not shown), and is configured to detect an object B around the vehicle. The vehicle carrying the object detection device 1 is hereinafter referred to as an own vehicle. The vehicle (not shown) is, for example, an automobile. The object detection device 1 includes an ultrasonic sensor 2 and a controller 3 that controls the operation of the ultrasonic sensor 2.

The ultrasonic sensor 2 is configured to detect the object B by transmitting probe waves that are ultrasonic waves and receiving reflected waves of the probe waves from the object B. Specifically, the ultrasonic sensor 2 includes a transmitter 20A and receivers 20B. The transmitter 20A is provided to transmit probe waves externally to the own vehicle. The receivers 20B are provided to receive ultrasonic waves including reflected waves from the object B of the probe waves transmitted from the transmitter 20A.

The ultrasonic sensor 2 includes transducers 21 as transceivers, a transmission circuit 22, reception circuits 23, a drive signal generator 24, a comparator 25, and a determiner 26. The transmitter 20A is formed of the transducer 21 and the transmission circuit 22. The receiver 20B is formed of the transducer 21 and the reception circuit 23.

The ultrasonic sensor 2 includes a plurality of transducers 21 and a plurality of reception circuits 23, forming a plurality of receivers 20B. One of the plurality of transducers 21 functions as a transmitter to transmit probe waves externally to the own vehicle and as a receiver to receive reflected waves, and is electrically connected to the transmission circuit 22 and the reception circuit 23. That is, the transmitter 20A and one of the plurality of receivers 20B share this transducer 21 to implement the transmitting and receiving functions. This transducer 21 is designated as a transducer 21A, and each of the other transducers 21 is designated as a transducer 21B. Each transducer 21B has a function as a receiver to receive reflected waves and is electrically connected to the reception circuit 23.

Each transducer 21 is configured as an ultrasonic microphone with a built-in electrical-mechanical energy conversion element, such as a piezoelectric element. The transducer 21A is disposed on the outer surface of the own vehicle such that it can transmit probe waves externally to the own vehicle and receive reflected waves externally from the own vehicle. Each transducer 21B is disposed at a position facing the outer surface of the own vehicle such that it can receive the reflected waves externally from the own vehicle.

Figure 2:
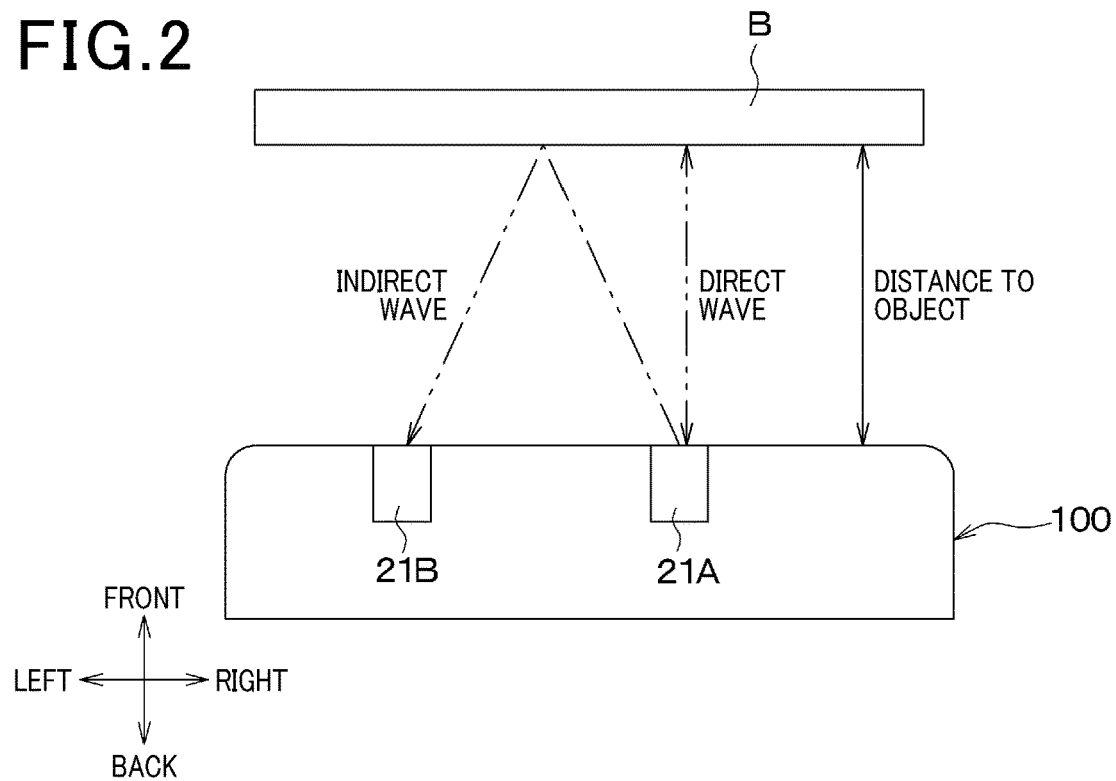
FIG. 2 is an illustration of an arrangement of transducers.

For example, as illustrated in FIG. 2, the transducers 21A and 21B are aligned along the lateral direction of the own vehicle, facing the front outer surface of the vehicle 100. The ultrasonic sensor 2 receives direct and indirect waves, as illustrated in FIG. 2. The direct wave is a probe wave transmitted and received by the same transducer 21. That is, the direct wave is the probe wave transmitted from the transducer 21A, reflected by an object outside the vehicle, and received by the transducer 21A. The indirect wave is a probe wave that is transmitted and received by different transducers 21. That is, the indirect wave is a probe wave transmitted from the transducer 21A, reflected by an object outside the vehicle, and received by the transducer 21B.

The transmission circuit 22 is provided to drive the transducer 21A based on the transmission signal received, thereby causing this transducer 21A to transmit a probe wave. Specifically, the transmission circuit 22 includes a digital-to-analog conversion circuit and the like.

That is, the transmission circuit 22 is configured to generate an element input signal by applying signal processing such as digital-to-analog conversion to the drive signal output from the drive signal generator 24. The element input signal is an AC voltage signal to drive the transducer 21A. The transmission circuit 22 is configured to apply the generated element input signal to the transducer 21A to excite the electrical-mechanical energy conversion element in the transducer 21A, thereby generating a probe wave.

Each reception circuit 23 is provided to generate a reception signal corresponding to the result of reception of the ultrasonic wave by the transducer 21 and output it to the comparator 25. Specifically, the reception circuit 23 includes an amplification circuit and an analog-to-digital conversion circuit. That is, the reception circuit 23 is configured to apply signal processing such as amplification and analog-to-digital conversion to the element output signal output by the transducer 21 to thereby generate a reception signal that includes information on the amplitude and frequency of the received wave. The element output signal is an AC voltage signal generated by the electrical-mechanical energy conversion element in the transducer 21 through reception of the ultrasonic wave.

The drive signal generator 24 is provided to generate a drive signal and output it to the transmission circuit 22. The drive signal is a signal for driving the transducer 21A to transmit a probe wave from the transducer 21A.

The comparator 25 compares a plurality of reception signals output from the plurality of reception circuits 23 and calculates a degree of similarity between the plurality of reception signals. Here, the degree of similarity indicates to what extent the amplitude waveforms of the plurality of reception signals are similar to each other. In the present embodiment, the case will now be described where the degree of similarity is calculated by comparing the amplitude waveforms of the direct and indirect waves.

The comparator 25 receives reception signals from respective ones of the plurality of reception circuits 23. The comparator 25 compares the reception signal output from the reception circuit 23 of the receiver 20B including the transducer 21A and the reception signal output from the reception circuit 23 of each receiver 20B including the transducer 21B, and calculates the degree of similarity. The comparator 25 outputs a calculation result of the degree of similarity to the determiner 26.

Figure 3:
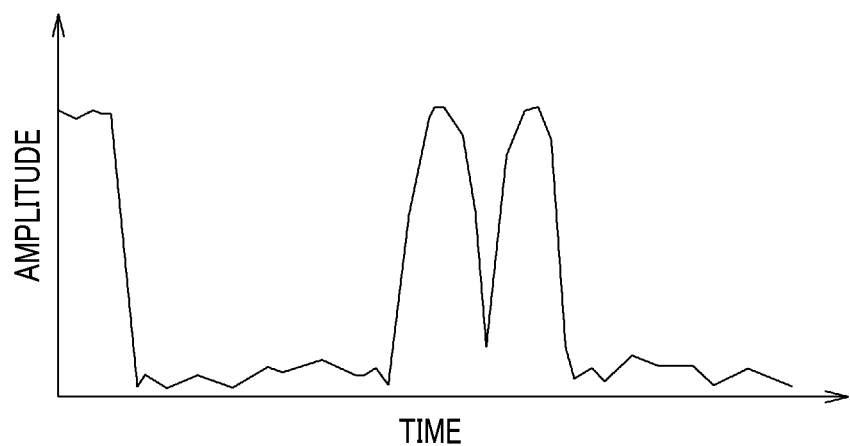
FIG. 3 is an example of an amplitude waveform of a direct wave.
Figure 4:
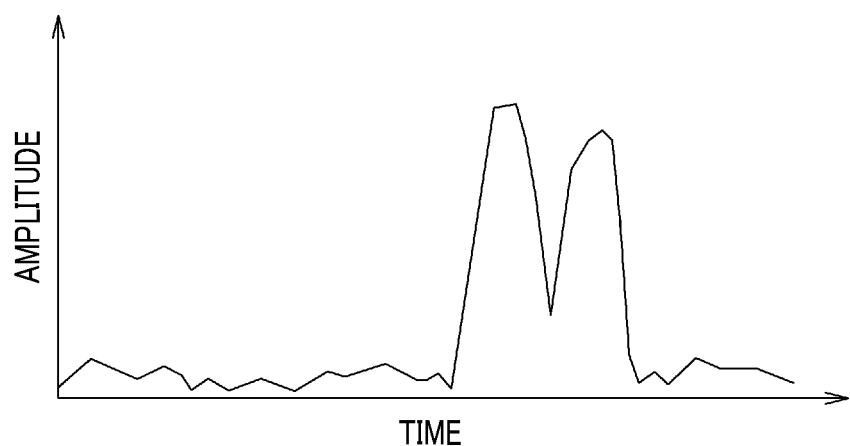
FIG. 4 is an example of an amplitude waveform of an indirect wave.

The comparator 25 compares a plurality of measurement points in the reception signal of each of the receivers 20B to calculate the degree of similarity between the reception signals. FIGS. 3 and 4 are examples of amplitude waveforms of direct and indirect waves, respectively. The comparator 25 calculates the degree of similarity between the amplitude waveforms of such direct and indirect waves.

The comparator 25 calculates the degree of similarity by cross-correlation. That is, the comparator 25 multiplies the amplitude at a certain one measurement point of the direct wave by the amplitude at the measurement point of the indirect wave corresponding to the time of the certain one measurement point of the indirect wave. The comparator 25 performs such multiplication for each measurement point of the direct wave. A sum of the multiplication results is the degree of similarity.

Since the direct and indirect waves propagate along different paths, the reflected wave is received at different times. The comparator 25 takes this into account when calculating the degree of similarity.

Figure 5:
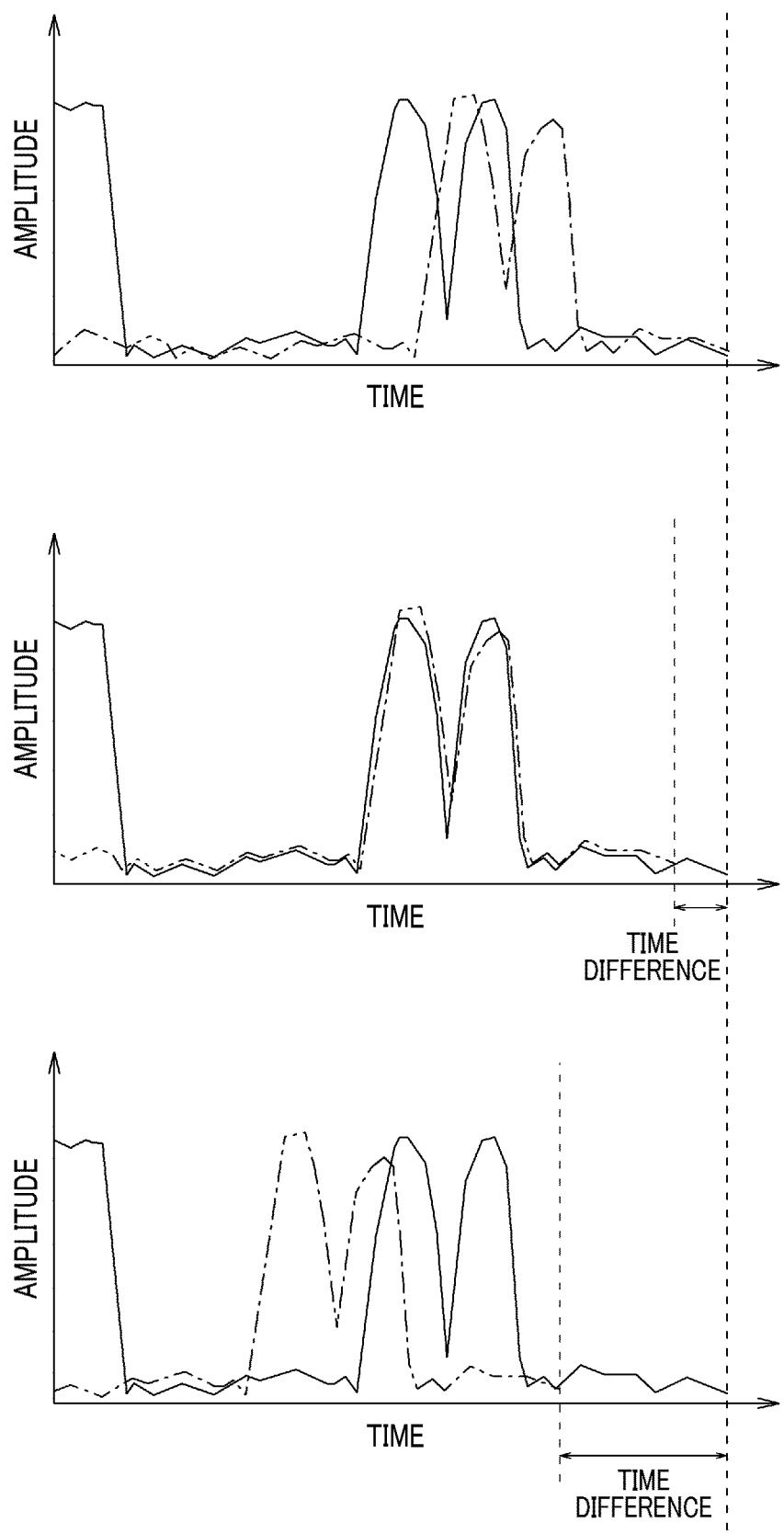
FIG. 5 is an illustration of how a degree of similarity is calculated.

In FIG. 5, the two amplitude waveforms illustrated in FIG. 3 and FIG. 4 are overlaid. In FIG. 5, the solid line indicates the reception signal of the direct wave, and the dashed-dotted line indicates the reception signal of the indirect wave. In the upper illustration of FIG. 5, the two waveforms illustrated in FIGS. 3 and 4 are overlaid as they are. In the middle illustration of FIG. 5, the waveform in FIG. 4 is shifted along the time axis and overlaid on the waveform of FIG. 3. In the lower illustration of FIG. 5, the waveform in FIG. 4 is shifted further along the time axis and overlaid on the waveform of FIG. 3.

As illustrated in FIG. 5, the degree of overlap of the two amplitude waveforms varies with an amount of shift of the amplitude waveform in FIG. 4, i.e., a time difference between the original waveform and the shifted waveform. That is, in the upper and lower illustrations of FIG. 5, the difference between the measurement points of the two waveforms is larger, resulting in a lower degree of similarity. On the other hand, in the middle illustration of FIG. 5, the difference between the measurement points of the two waveforms is smaller, resulting in a higher degree of similarity. The comparator 25 calculates the degree of similarity while shifting the amplitude waveform of the indirect wave in this manner, and outputs the maximum value among the calculated results to the determiner 26.

A range for varying the above time difference is set as follows. Since ultrasonic waves attenuate with distance, there is a limit to the distance at which each of the receivers 20B can detect the ultrasonic waves. The comparator 25 sets a time range for calculating the degree of similarity based on this distance limit, that is, a detection range of each of the receivers 20B.

The comparator 25 converts the detection range of each of the receivers 20B into the time difference between direct and indirect waves based on the speed of sound and the positional relationship between the receivers 20B. The comparator 25 then sets the range in which the time difference is changed based on the time difference acquired through the conversion. For example, the comparator 25 shifts the amplitude waveform of the indirect wave in a range from a time difference that is a predefined amount less than the reference to a time difference that is a predefined amount greater than the reference.

The determiner 26 determines whether there is an object to be detected based on the degree of similarity calculated by the comparator 25. Here, the object to be detected is considered to be a tall object protruding from the road surface. For example, an object having a height greater than or equal to a predefined value from the road surface may be an object to be detected.

For an object to be detected, the determiner 26 further determines whether the object is an obstacle. Whether the object is an obstacle is set based on the possibility of contact between the object and the vehicle body. For example, if the height from the ground is greater than a predefined value, the object is determined to be an obstacle, and if the height from the ground is less than or equal to the predefined value, the object is determined not to be an obstacle.

The determiner 26 at least calculates a distance between the own vehicle and the object. The determiner 26 transmits the determination result for the object and the calculation result of the distance to the controller unit 3.

For example, the drive signal generator 24, the comparator 25, and the determiner 26 embodied by a DSP programmed with the aforementioned functions, such as drive signal generation, calculation of the degree of similarity, object detection determination, object height determination, object distance calculation, and other functions. The DSP stands for Digital Signal Processor.

The controller 3 is connected to the ultrasonic sensor 2 via an in-vehicle communication line to enable information communication, and is configured to control transmitting and receiving operations of the ultrasonic sensor 2.

The controller 3 is provided as a so-called sonar ECU and is equipped with an on-board microcomputer including a CPU, a ROM, a RAM, a non-volatile rewritable memory, and others, which are not shown in the figures. The ECU is an abbreviation for Electronic Control Unit. The non-volatile rewritable memory is, for example, an EEPROM, a flash ROM, or the like. The EEPROM is an abbreviation for Electronically Erasable and Programmable Read Only Memory. The ROM, RAM, and the like are non-transitory tangible storage media.

Figure 6:
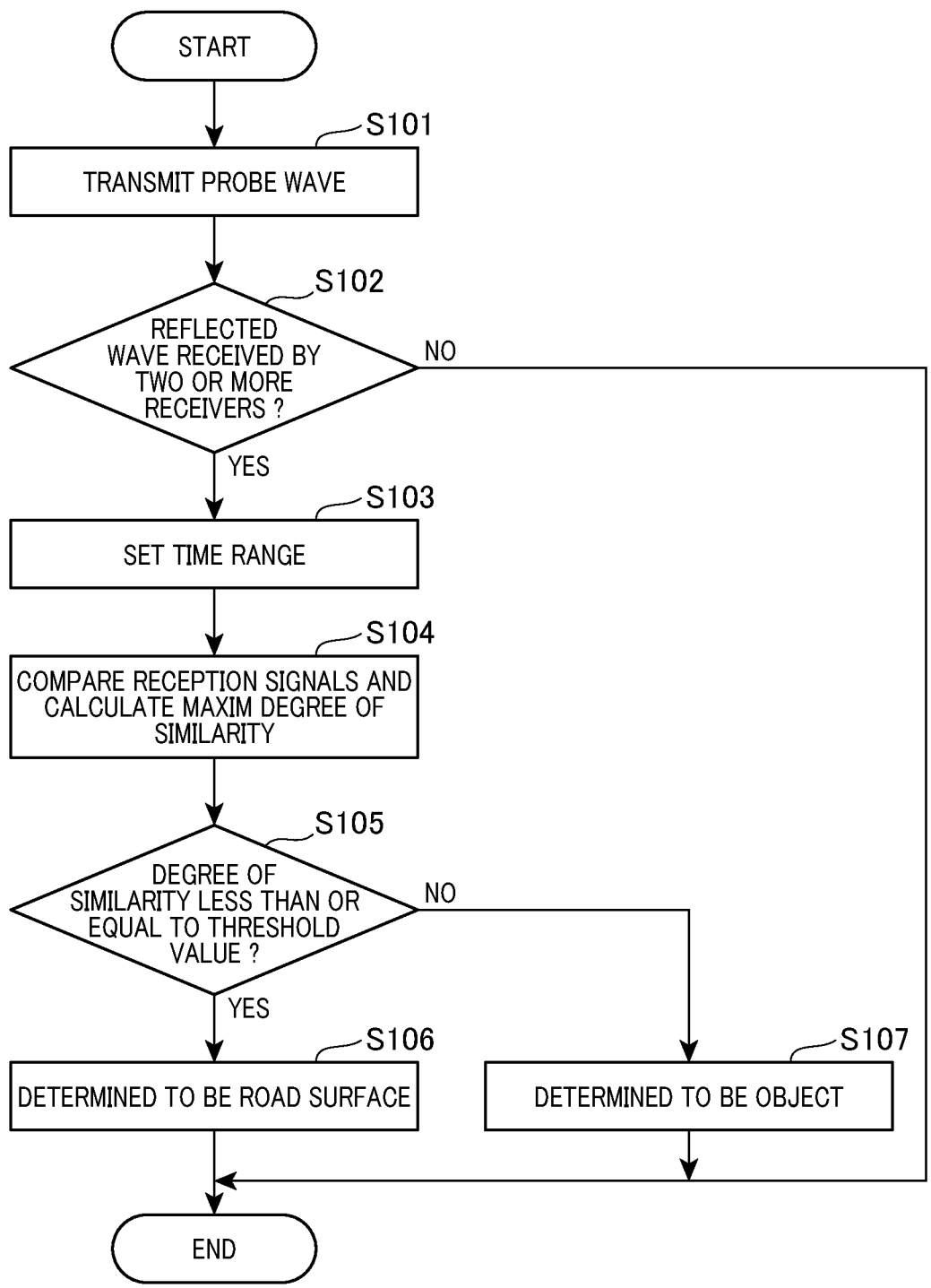
FIG. 6 is a flowchart of an object detection process.

The operations of the object detection device 1 will now be described. The object detection device 1 repeatedly performs an object detection process as illustrated in FIG. 6.

At step S101, a transmission instruction is output from the controller 3 to the drive signal generator 24, and a probe wave is transmitted from the transmitter 20A according to the drive signal generated by the drive signal generator 24.

At subsequent step S102, the comparator 25 determines whether a reflected wave has been received by two or more receivers 20B. Specifically, the comparator 25 determines whether a reflected wave has been received by the receiver 20B including the transducer 21A and any one of the other receivers 20B each including the transducer 21B. For example, when the amplitude of the reception signal output from a certain one of the reception circuits 23 is greater than a predefined value, it is determined that a reflected wave has been received by the receiver 20B including this reception circuit 23.

If it is determined at step S102 that a reflected wave has been received by two or more receivers 20B, the process proceeds to step S103. On the other hand, if it is determined at step S102 that a reflected wave has not been received by two or more receivers 20B, that is, the number of receivers 20B that have received a reflected wave is 0 or 1, the process is terminated.

At step S103, the comparator 25 sets a range for shifting the amplitude waveform of the reception signal along the time axis. At subsequent step S104, the comparator 25 compares the reception signals output from the two or more receivers 20B and calculates a maximum value of the degree of similarity. The comparator 25 calculates the degree of similarity by shifting the amplitude waveform of one of the reception signals along the time axis within the range set at step S103. The comparator 25 sends the calculated maximum value of the degree of similarity to the determiner 26.

At subsequent step S105, the determiner 26 compares degree of similarity calculated by the comparator 25 with a predefined threshold value to determine whether the degree of similarity is less than or equal to the threshold value. As described above, at step S104, the comparator 25 has calculated the maximum value of the degree of similarity, and at step S105, the determiner 26 compares this maximum value of the degree of similarity with the threshold value. If the degree of similarity is determined to be less than or equal to the threshold value, the process proceeds to step S106. On the other hand, if the degree of similarity is determined to be greater than the threshold value, the process proceeds to step S107.

At step S106, the determiner 26 determines that the unevenness of the road surface or the like has returned the reflected wave. At step S107, the determiner 26 determines that a tall object has returned the reflected wave. This tall object is not limited to a tall object that may come into contact with the vehicle body, but includes a low object such as a bump on the road surface. Upon completion of step S106 or S107, the process is terminated.

Upon completion of the process illustrated in FIG. 6, the result of detection of the object by the ultrasonic sensor 2 is transmitted to the controller 3. This detection result includes a result of the determination at each of steps S106 and S107. Upon detecting an object at step S107, the determiner 26 determines whether the detected object is a tall object that may come into contact with the vehicle body, and transmits this determination result to the controller 3. The detection result transmitted to the controller 3 includes, for example, a distance between the own vehicle and the object, measured by the TOF method. TOF is an abbreviation for Time of Flight. The controller 3 controls the collision avoidance operation and other operations based on the detection result transmitted from the ultrasonic sensor 2.

Figure 7:
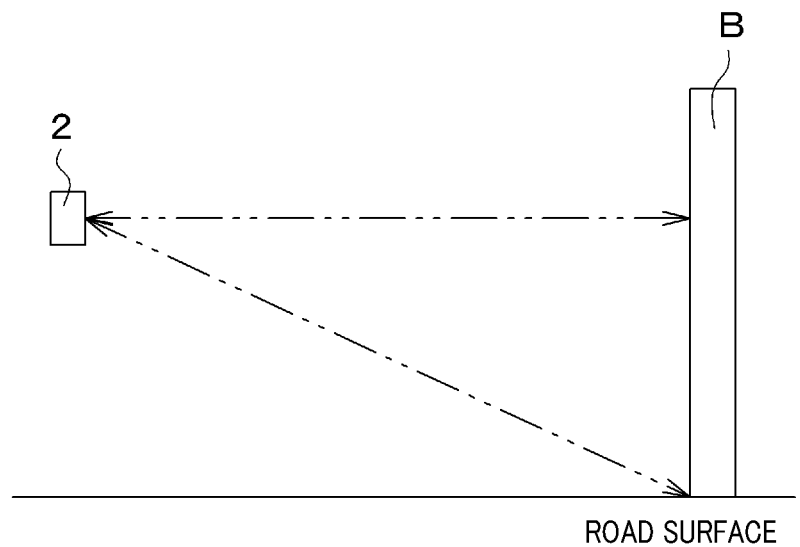
FIG. 7 is an illustration of reflected waves from a tall wall.
Figure 8:
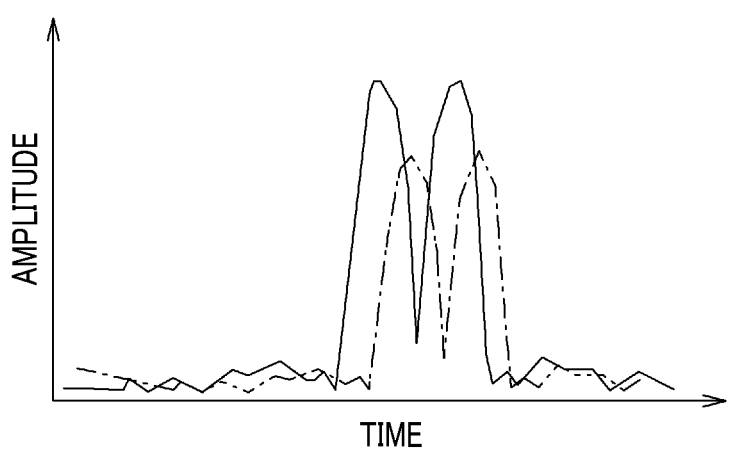
FIG. 8 is an illustration of amplitude waveforms of reflected waves from a tall wall.

As illustrated in FIG. 7, it is assumed that a probe wave is transmitted toward a tall object, such as a wall. In this case, as indicated by the double-dashed arrows, a reflected wave is returned from a portion of the object located facing the ultrasonic sensor 2 and from the base of the object. As a result, the amplitude waveform of the reception signal has two peaks, as illustrated in FIG. 8. In FIG. 8, as well as in FIGS. 10, 12, and 14 described later, the solid line indicates the amplitude waveform of the direct wave reception signal, and the dashed-dotted line indicates the amplitude waveform of the indirect wave reception signal.

Figure 9:
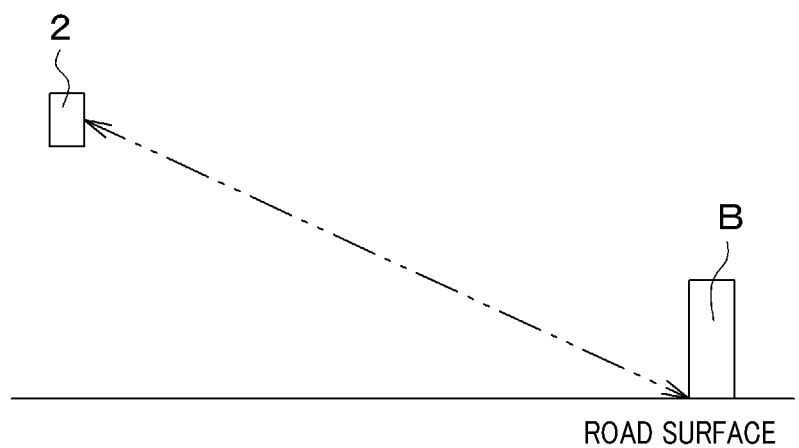
FIG. 9 is an illustration of a reflected wave from a low step.
Figure 10:
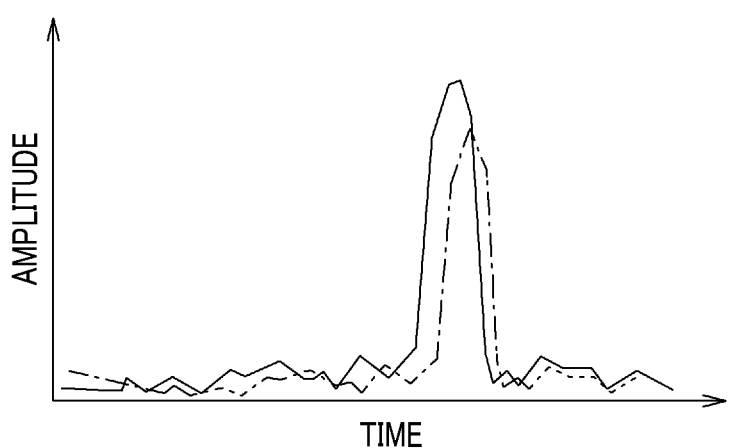
FIG. 10 is an illustration of amplitude waveforms of reflected waves from a low step.

As illustrated in FIG. 9, it is assumed that a probe wave is transmitted toward a low object, such as a bump on the road surface. In this case, a reflected wave is returned from the base of the object. As a result, as illustrated in FIG. 10, the amplitude waveform of the reception signal has only one peak.

Figure 11:
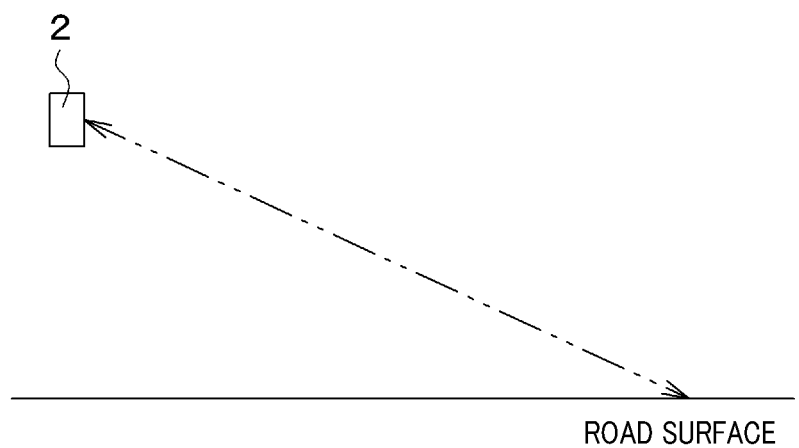
FIG. 11 is an illustration of a reflected wave from a road surface with small unevenness.
Figure 12:
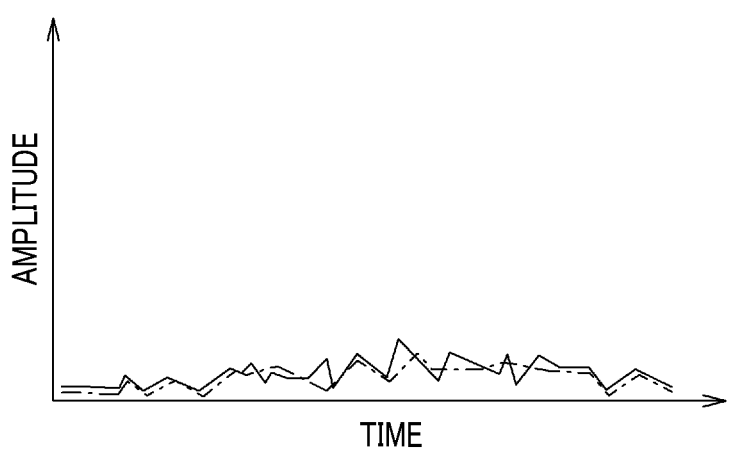
FIG. 12 is an illustration of amplitude waveforms of reflected waves from a road surface with small unevenness.

As illustrated in FIG. 11, it is assumed that a probe wave is transmitted toward the road surface. In this case, if the unevenness of the road surface is small, there is no reflection point that returns a reflection wave with high intensity. As a result, as illustrated in FIG. 12, the amplitude waveform of the reception signal has no clear peak and is generally low in intensity.

From these facts, it seems that the height of an object may be determined by the number of peaks in the reception signal. That is, if the number of peaks in the reception signal is two, the object is determined to be a tall object. If the number of peaks is one, the object is determined to be a low object. If there are no peaks, the reflection is determined to be from the road surface.

Figure 13:
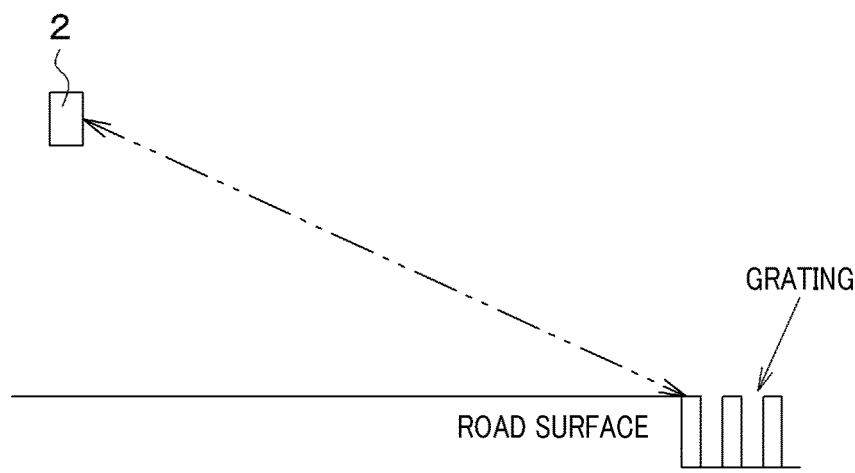
FIG. 13 is an illustration of a reflected wave from grating.
Figure 14:
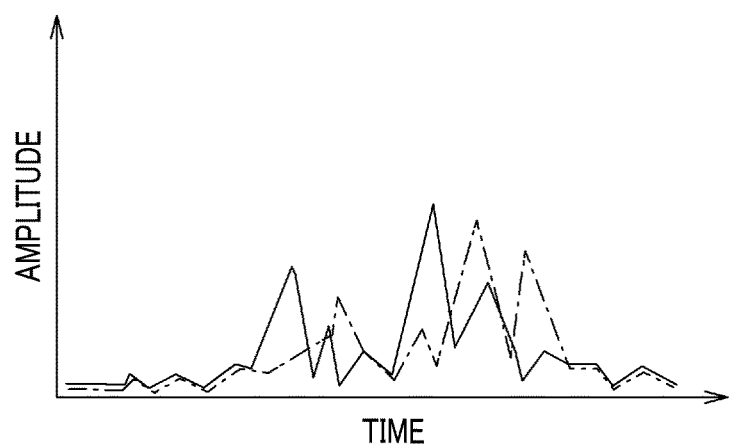
FIG. 14 is an illustration of amplitude waveforms of reflected waves from grating.

Actually, however, the case illustrated in FIG. 13 may also occur. In FIG. 13, a probe wave is transmitted toward a road surface with large unevenness, such as grating. In this case, the unevenness of the road surface causes a plurality of reflected waves with high intensity to be returned. As a result, the amplitude waveform of the reception signal has a plurality of peaks, as illustrated in FIG. 14. Therefore, in the aforementioned method of determining the height of an object based on the number of peaks, there is a risk of incorrectly determining that the reflected waves from a road surface with large unevenness are from a tall object.

By contrast, in the present embodiment, the height of an object is determined based on the degree of similarity between the direct and indirect waves. Reflected waves from a tall object have high intensity, and the degree of similarity between the direct and indirect waves is high. On the other hand, although reflected waves from a road surface may have high intensity due to the unevenness of the road surface as with the reflected waves from a tall object, the degree of similarity between the direct and indirect waves is low. This is because the shape of the amplitude waveform differs significantly depending on the measurement position due to complexity of the reflection path. Therefore, making an object detection determination based on the degree of similarity can suppress false determinations. The finding that the degree of similarity is high between reflected waves from a tall object, but low between reflected waves from the ground, was made by the present inventors through their diligent research.

As described above, in the present embodiment, a plurality of reception signals are compared, the degree of similarity between the plurality of reception signals is calculated, and a determination as to whether there is an object to be detected is made based on this degree of similarity. This can suppress false determinations in the object detection determination and improve the accuracy of determination. Since the determination can be made by acquiring two amplitude waveforms, an object can be detected with a small amount of calculation. In addition, since the amplitude waveforms can be compared by transmitting one probe and no movement of the own vehicle is required for object detection, the object detection determination can be made even when the own vehicle is stationary.

The above embodiment can provide the following advantages.

(1) The amplitude waveform is shifted along the time axis, the maximum value of the degree of similarity is calculated, and a determination is made based on this maximum value. Therefore, the effect of the difference in propagation time between direct and indirect waves is reduced and the accuracy of determination is improved.

(2) The time range for comparing a plurality of reception signals is set according to positions of two or more receivers 20B and detection ranges of the two or more receivers 20B. This can reduce the number of false positives and the amount of calculation.

Second Embodiment

A second embodiment will be described. In the present embodiment, the method of setting the time range is changed as compared to the first embodiment, and the other features are the same as those in the first embodiment. Thus, only the differences from the first embodiment will be described.

Figure 15:
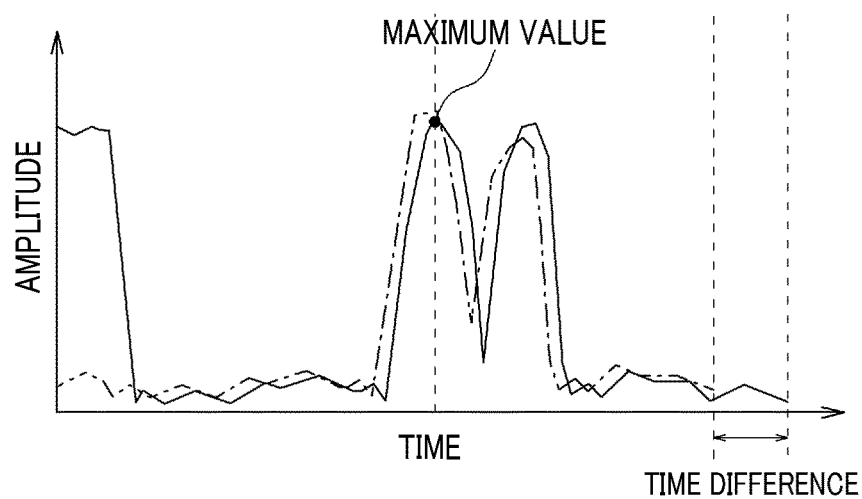
FIG. 15 is an illustration of a time range for calculating a degree of similarity according to a second embodiment.

In the first embodiment, the time range for calculating the degree of similarity is set based on the detection range of each of the receivers 20B, but this time range may be set in another manner. For example, the comparator 25 may set the time range based on peaks of the plurality of reception signals. That is, the comparator 25 detects peaks from the plurality of reception signals and calculates a time difference when the time at which the direct wave peaks and the time at which the indirect wave peaks match, as illustrated in FIG. 15. The comparator 25 uses this time difference as a reference to set the range for shifting the amplitude waveform of the indirect wave. In FIG. 15, the solid line indicates the amplitude waveform of the reception signal of the direct wave, and the dashed-dotted line indicates the amplitude waveform of the reception signal of the indirect wave.

As for reflected waves from a tall object, such as a wall or a step, each of the direct wave and the indirect wave has peaks. When the amplitude waveforms of the direct wave and the indirect wave match best, the time at which the amplitude waveform of the direct wave peaks and the time at which the amplitude waveform of the indirect wave peaks are almost the same, although they may deviate due to air fluctuation and other factors. Therefore, setting the time range based on the time difference when the times of peaks match makes it possible to reduce the number of false positives and the amount of calculation.

The present embodiment can provide the same advantages as the first embodiment from the same configuration and actuation as in the first embodiment.

The above embodiment can provide the following advantage.

(1) The time range for calculating the degree of similarity is set based on the peaks of a plurality of reception signals. This can reduce the number of false positives and the amount of calculation.

Third Embodiment

A third embodiment will be described. In the present embodiment, a degree-of-similarity correction process is added as compared to the first embodiment, and the other features are the same as those in the first embodiment. Thus, only the differences from the first embodiment will be described.

Figure 16:
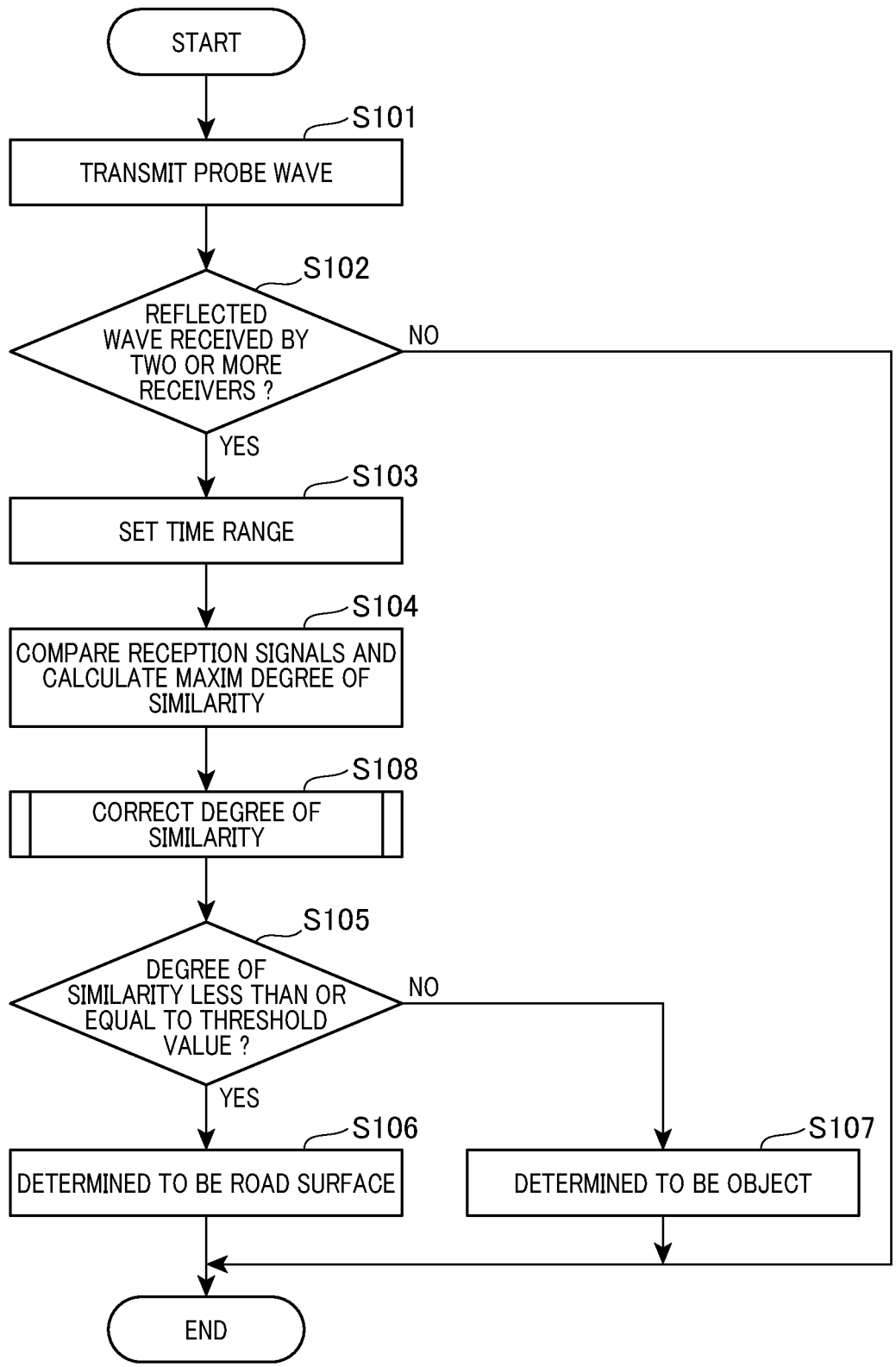
FIG. 16 is a flowchart of an object detection process according to a third embodiment.

In the present embodiment, the determiner 26 makes a determination taking into account an amount of change in the degree of similarity, the maximum values of the intensities of the plurality of reception signals, and the degree of match between rise times in the plurality of reception signals. Specifically, as illustrated in FIG. 16, after step S104, the process proceeds to step S108, where the comparator 25 corrects the degree of similarity calculated at step S104. The subroutine illustrated in FIG. 17 corresponds to the degree-of-similarity correction process at step S108 illustrated in FIG. 16.

In this subroutine, first, at step S201, the comparator 25 determines whether the amount of change in the degree of similarity calculated at step S104 is greater than or equal to a predefined value. When calculating the degree of similarity at step S104, the comparator 25 also calculates the amount of change in the degree of similarity. The amount of change in the degree of similarity is calculated, for example, as follows.

That is, the comparator 25 calculates the degree of similarity while shifting the amplitude waveform of the indirect wave along the time axis and stores a relationship between the time difference and the degree of similarity. Then, with the time difference when the degree of similarity reaches the maximum value being a reference, the comparator 25 selects, as a comparison, the degree of similarity when the time difference is greater or less than the reference by a predefined value. The comparator 25 calculates, as an amount of change in the degree of similarity, a difference between the maximum value of the degree of similarity and the degree of similarity as the comparison. Alternatively, the comparator 25 calculates a ratio of the maximum value of the degree of similarity to the degree of similarity as the comparison, specifically, the maximum value of the degree of similarity divided by the degree of similarity as the comparison, as the amount of change in the degree of similarity.

If the amount of change is determined to be greater than or equal to a predefined value at step S201, the process proceeds to step S202. If the amount of change is determined to be less than the predefined value, the process proceeds to step S203.

At step S202, the comparator 25 increases the degree of similarity used for determination at step S105. This facilitates a determination of the degree of similarity being greater than the threshold value at step S105. After step S202, the process proceeds to step S203.

At step S203, the comparator 25 determines whether the maximum value of the intensity of the reception signal output from each of the two or more receivers 20B is greater than or equal to a predefined value. Specifically, for each of the direct and indirect waves, the comparator 25 determines whether the maximum value of the amplitude of the reception signal is greater than or equal to a predefined value.

If the maximum value of the amplitude is determined to be greater than or equal to the predefined value at step S203, the process proceeds to step S204. If the maximum value of amplitude is determined to be less than the predefined value, the process proceeds to step S205.

At step S204, the comparator 25 increases the degree of similarity used for determination at step S105. This facilitates a determination of the degree of similarity being greater than the threshold value at step S105. After step S204, the process proceeds to step S205.

At step S205, the comparator 25 determines whether the degree of match between amplitude rise times in the plurality of reception signals output from the two or more receivers 20B is greater than or equal to a predefined value. For example, the comparator 25 compares slopes of the reception signals at the amplitude rise times in the direct wave and the indirect wave, and determines whether this degree of match is greater than or equal to a predefined value by using the reciprocal of a difference between the slopes as the degree of match.

If the degree of match is determined to be greater than or equal to the predefined value at step S205, the process proceeds to step S206. If the degree of match is determined to be less than the predefined value, the subroutine is terminated.

At step S206, the comparator 25 increases the degree of similarity used for determination at step S105. This facilitates a determination of the degree of similarity being greater than the threshold value at step S105. After step S206, this subroutine is terminated.

Figure 17:
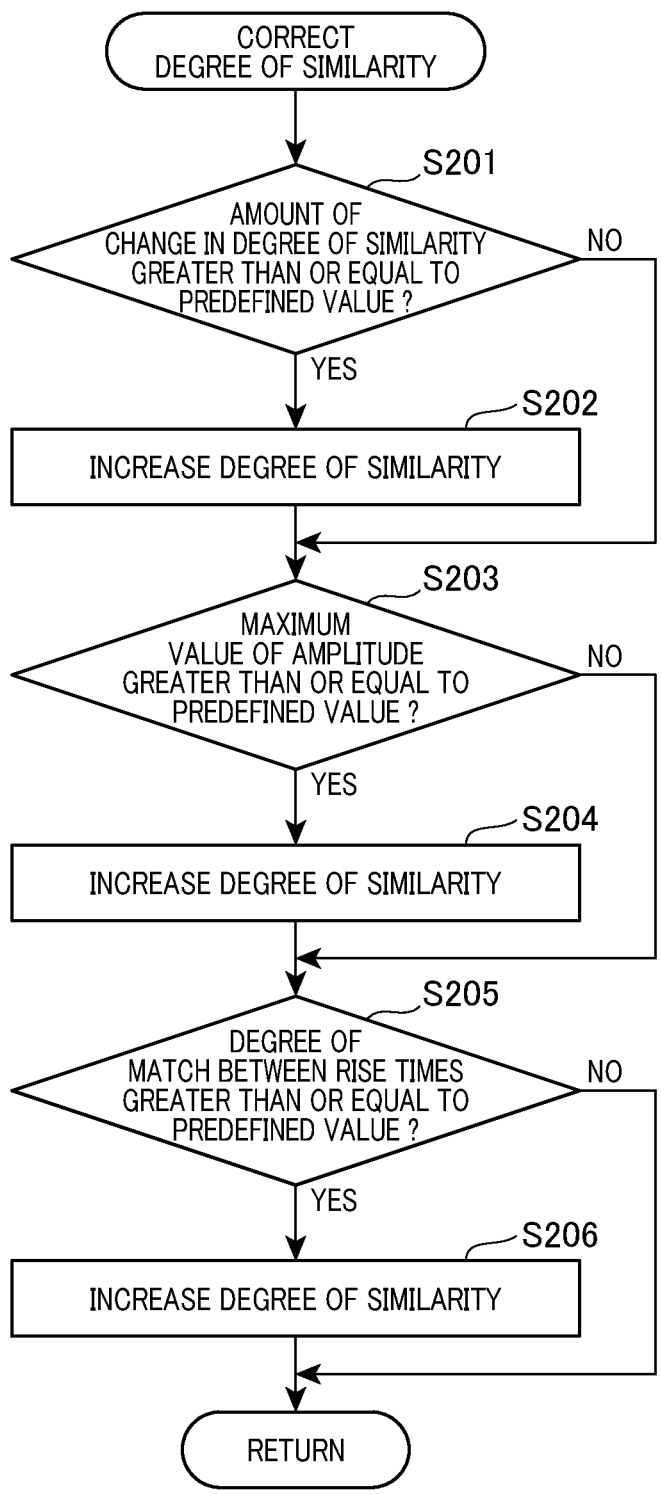
FIG. 17 is a flowchart of a degree-of-similarity correction process.

Upon completion of the subroutine in FIG. 17, the process proceeds to step S105 illustrated in FIG. 16. At step S105, the determiner 26 determines whether the degree of similarity is less than or equal to the threshold value using the degree of similarity corrected according to the amount of change in the degree of similarity, the maximum values of the intensities of the plurality of reception signals, and the degree of match between the rise times in the plurality of reception signals.

Figure 18:
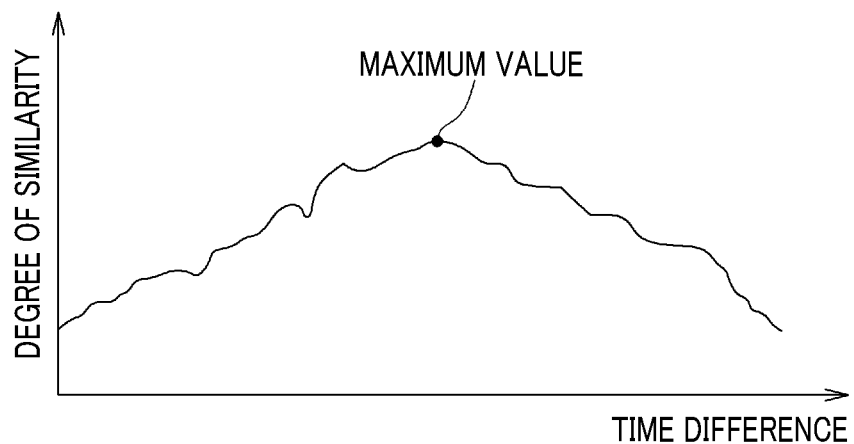
FIG. 18 is an illustration of a relationship between time difference and degree of similarity between reflected waves from an uneven road surface.
Figure 19:
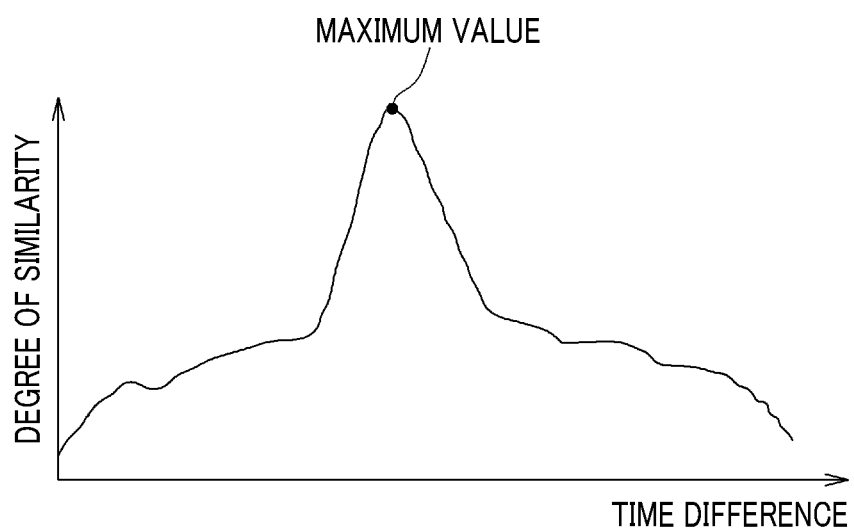
FIG. 19 is an illustration of a relationship between time difference and degree of similarity between reflected waves from an object.

FIG. 18 illustrates a relationship between the time difference and the degree of similarity when a probe wave is transmitted toward a road surface with large unevenness, such as grating. FIG. 19 illustrates a relationship between the time difference and the degree of similarity when a probe wave is transmitted toward a tall object, such as a wall or a step. As illustrated in FIGS. 18 and 19, the amount of change in the degree of similarity is likely to be small for a road surface with unevenness, such as grating, while the maximum value of the degree of similarity is likely to be prominently high for an object with a clear peak in the reflected wave, such as a wall and a step. Therefore, the object detection accuracy can be improved by making it easier to determine that the object is a tall object when the amount of change in the degree of similarity is large, as in steps S201 and S202. This relationship between the type of object and the amount of change in the degree of similarity was found by the present inventors through their diligent research.

In cases where an object such as a wall is far away, depending on the positional relationship between the ultrasonic sensor 2 and the object, the reflected wave from the portion of the object facing the ultrasonic sensor 2 and the reflected wave from the base of the object may overlap, reducing the calculated degree of similarity. The object detection accuracy can be improved by making it easier to determine that the object is a tall object when the maximum values of the intensities of the reception signals are greater than the predefined value, as in steps S203 and S204. In addition, as in steps S205 and S206, the object detection accuracy can be improved by making it easier to determine that the object is a tall object when the degree of match between rise times is greater than the predefined value.

The present embodiment can provide the same advantages as the first embodiment from the same configuration and actuation as in the first embodiment.

The above embodiment can provide the following advantages.

(1) The determination is made by taking into account changes in the degree of similarity. This can improve the object detection accuracy.

(2) The determination is made by taking into account the maximum values of the intensities of the plurality of reception signals. This can improve the object detection accuracy.

(3) The determination is made by taking into account a degree of match between rise times in the plurality of reception signals. This can improve the object detection accuracy.

Other Embodiments

The present disclosure is not limited to the embodiments described above, and the embodiments may be changed as appropriate. Each of the above embodiments is not unrelated to one another and can be combined as appropriate, except when the combination is clearly not possible. Needless to say, in the embodiments, the elements constituting the embodiments are not necessarily essential unless the elements are specified to be essential or the elements are considered to be apparently essential in principle.

For example, in the first to third embodiments, the degree of similarity is calculated by comparing the amplitude waveforms of the direct and indirect waves. Alternatively, the degree of similarity may be calculated by comparing the amplitude waveforms of the indirect waves received by two transducers 21B, and an object detection determination may be made based on this degree of similarity.

In the first to third embodiments, an object to be detected is placed on the ground. Alternatively, an object protruding from the ceiling or wall of a passageway may be detected. For an object protruding from the ceiling or wall of a passageway, a determination as to whether it is an obstacle may be made based on the size of protrusion.

The comparator 25 may calculate the absolute value of the difference between the direct wave measurement point and the indirect wave measurement point at the same time, perform such a calculation for each direct wave measurement point, and use the reciprocal of the sum of the calculation results as the degree of similarity. Instead of the absolute value of the difference described above, the square of the difference may be used to calculate the degree of similarity.

Among the measurement points of direct and indirect waves, those whose amplitudes are smaller than a threshold value may be considered noise and excluded from the calculation of degree of similarity.

In the first to third embodiments, the amplitude waveform of the indirect wave is shifted along the time axis. Alternatively, the degree of similarity may be calculated while shifting the amplitude waveform of the direct wave along the time axis.

The range over which the amplitude waveform of the indirect wave is shifted along the time axis may be set in a different manner than in each of the first and second embodiments. For example, the upper and lower limits of this range may be set to constant values.

In the second embodiment, the degree of similarity may be corrected as in the third embodiment.

In the third embodiment, only one or two of an amount of change in the degree of similarity, the maximum values of the intensities of the plurality of reception signals, and the degree of match between rise times in the plurality of reception signals may be taken into account to make a determination.

In cases where a plurality of peaks are detected in each of two reception signals, the degree of similarity may be corrected according to the degree of match between the peak-to-peak time differences. For example, when a difference between the peak-to-peak time difference in one of the reception signals and the peak-to-peak time difference in the other of the reception signals is less than or equal to a predefined value, the degree of similarity used for the determination at step S105 may be increased.

Alternatively, the degree of similarity may be corrected according to the degree of match between peak widths in the two reception signals. For example, a portion of each reception signal that is greater than a threshold value may be extracted from the reception signal, and a time width of this portion may be used as the peak width. A difference between the peak widths in the two reception signals may be calculated, and the degree of similarity used for the determination at step S105 may be increased when this difference is less than a predefined value.

The time difference when the degree of similarity is maximized may be used to determine the width (lateral dimension) of an object. For example, it is assumed that an object such as a wall is in front of the vehicle 100, as shown in FIG. 2. In this case, a distance to the object may be measured using the TOF method or any other method based on the time when the reception signal of the direct wave peaks. Based on this measured distance and the positional relationship between the transducers 21A and 21B, a distance between the reflection point that returned the direct wave and the transducer 21B may be calculated. The distance of propagation of the indirect wave may be calculated by adding to the distance of propagation of the direct wave the time difference when the degree of similarity is maximized, which is converted into a distance, more accurately than, for example, the method of detecting the reflected wave by comparing the amplitude of the reception signal with a threshold value.

For example, in a case where the object is a narrow pole or the like, the positions of reflection points of the direct and indirect waves will be close to each other. Therefore, the distance acquired by subtracting the distance to the object measured based on the direct wave from the propagation distance of the indirect wave is almost the same as the distance calculated based on the positional relationship of transducers 21A and 21B as described above. In contrast, in a case where the object is a wide wall or the like, the reflection points of the direct and indirect waves will be separated. Thus, these two distances are different.

Therefore, based on whether these two distances match, a determination may be made as to whether the width of the object is large. For example, when the difference between the two distances is less than or equal to a threshold value, the determiner 26 determines that the width of the object is less than or equal to a predefined value, and when the difference between the two distances is greater than the threshold value, the determiner 26 determines that the width of the object is greater than the predefined value.

In the above embodiments and modifications, the comparator, the determiner, the controller, and the method thereof described in the present disclosure may be implemented by a special purpose computer which is configured with a memory and a processor programmed to execute one or more particular functions embodied in computer programs of the memory. Alternatively, the comparator, the determiner, the controller, and the method thereof described in the present disclosure may be implemented by a dedicated computer configured as a processor with one or more dedicated hardware logic circuits. Alternatively, the comparator, the determiner, the controller, and the method thereof described in the present disclosure may be implemented by one or more dedicated computer, which is configured as a combination of a processor and a memory, which are programmed to perform one or more functions, and a processor which is configured with one or more hardware logic circuits. The computer program may also be stored on a computer readable non-transitory tangible storage medium as instructions to be executed by a computer.

What is claimed is:

1. An object detection device for detecting an object by transmitting and receiving ultrasonic waves, comprising:
    a transmitter that transmits an ultrasonic wave;
    two or more receivers, each of which receives an ultrasonic wave and outputs a reception signal according to the received ultrasonic wave;
    a comparator that compares the plurality of reception signals output from the two or more receivers and calculates a degree of similarity between the plurality of reception signals; and
    a determiner that makes a determination as to whether there is an object to be detected, based on the degree of similarity,
    wherein
    the determiner makes the determination by taking into account an amount of change in the degree of similarity.

2. The object detection device according to claim 1, wherein
    the determiner makes the determination based on a maximum value of the degree of similarity.

3. The object detection device according to claim 1, wherein
    the comparator calculates the degree of similarity based on a correlation between the plurality of reception signals.

4. An object detection device for detecting an object by transmitting and receiving ultrasonic waves, comprising:
    a transmitter that transmits an ultrasonic wave;
    two or more receivers, each of which receives an ultrasonic wave and outputs a reception signal according to the received ultrasonic wave;
    a comparator that compares the plurality of reception signals output from the two or more receivers and calculates a degree of similarity between the plurality of reception signals; and
    a determiner that makes a determination as to whether there is an object to be detected, based on the degree of similarity,
    wherein
    the comparator sets a time range for comparing the plurality of reception signals according to positions of the two or more receivers and detection ranges of the two or more receivers.

5. An object detection device for detecting an object by transmitting and receiving ultrasonic waves, comprising:
    a transmitter that transmits an ultrasonic wave;
    two or more receivers, each of which receives an ultrasonic wave and outputs a reception signal according to the received ultrasonic wave;
    a comparator that compares the plurality of reception signals output from the two or more receivers and calculates a degree of similarity between the plurality of reception signals; and
    a determiner that makes a determination as to whether there is an object to be detected, based on the degree of similarity,
    wherein
    the comparator sets a time range for comparing the plurality of reception signals based on peaks of the plurality of reception signals.

6. The object detection device according to claim 1, wherein
    the determiner makes the determination by taking into account maximum values of intensities of the plurality of reception signals.

7. The object detection device according to claim 1, wherein
    the determiner makes the determination by taking into account a degree of match between rise times in the plurality of reception signals.

8. The object detection device according to claim 4, wherein
    the determiner makes the determination based on a maximum value of the degree of similarity.

9. The object detection device according to claim 4, wherein
    the comparator calculates the degree of similarity based on a correlation between the plurality of reception signals.

10. The object detection device according to claim 4, wherein
    the determiner makes the determination by taking into account maximum values of intensities of the plurality of reception signals.

11. The object detection device according to claim 4, wherein
    the determiner makes the determination by taking into account a degree of match between rise times in the plurality of reception signals.

12. The object detection device according to claim 5, wherein
    the determiner makes the determination based on a maximum value of the degree of similarity.

13. The object detection device according to claim 5, wherein
    the comparator calculates the degree of similarity based on a correlation between the plurality of reception signals.

14. The object detection device according to claim 5, wherein
    the determiner makes the determination by taking into account maximum values of intensities of the plurality of reception signals.

15. The object detection device according to claim 5, wherein
the determiner makes the determination by taking into account a degree of match between rise times in the plurality of reception signals.

\* \* \* \* \*